April 2, 1957  G. R. BENZ  2,787,127
L. P. G. SAFETY DEVICE
Filed Dec. 22, 1952  2 Sheets-Sheet 1

INVENTOR.
GEORGE R. BENZ

ATTORNEYS

April 2, 1957  G. R. BENZ  2,787,127
L. P. G. SAFETY DEVICE
Filed Dec. 22, 1952  2 Sheets-Sheet 2

INVENTOR.
GEORGE R. BENZ
BY
ATTORNEYS

United States Patent Office 2,787,127
Patented Apr. 2, 1957

2,787,127

L. P. G. SAFETY DEVICE

George R. Benz, Bartlesville, Okla., assignor to Phillips Petroleum Company, a corporation of Delaware Application December 22, 1952, Serial No. 327,400

7 Claims. (Cl. 62—1)

This invention relates to liquefied petroleum gas storage systems. In one aspect it relates to a safety device for use in conjunction with liquefied petroleum gas storage systems.

Large relief valves used in liquefied petroleum gas storage tanks are provided with a drain hole or orifice for disposal of water, such drainage means being required by state or other regulations. Such drain holes can be dangerous in event of fire when the relief valves pop, in that the flame fed by vapors flowing through the drain holes can impinge on the tank shells to weaken them and expose them to possible rupture. Flame deflectors have been considered for directing the flames from the drain holes upward and away from the tank shells, but it is preferred to prevent the flames at this point by providing some automatic device which will close the drain holes the moment a relief valve pops.

One object of my invention is to provide means for elimination of at least one hazard in liquefied petroleum gas storage systems.

Another object of my invention is to provide a device for the prevention of the spread of fire to other liquefied petroleum gas storage tanks in case one or more tanks closely situated are on fire.

Still another object of my invention is to provide a simple and inexpensive means for the prevention of the spread of fire to other liquefied petroleum gas storage tanks in case one or more tanks closely situated are on fire.

Yet another object of my invention is to provide an apparatus which will prevent LPG vapors and resultant flame in case of fire from impinging against the tank shell and possibly causing tank failure at pressures below relief pressure.

These and other objects of my invention will be realized upon reading the following disclosure which taken with the attached drawing forms a part of this specification.

I accomplish these and other objects and advantages by providing a flow controlling shut-off valve for use on the outlet end of a water drain hole of a relief valve disposed in communication with the vapor containing space of a liquefied petroleum gas storage tank. One type of valve useful according to my invention may be termed an excess flow check valve. My check valve is of a type and is so arranged with respect to the above-mentioned drain hole that when the relief valve pops, the check valve closes to shut off flow of popped fluid through the drain hole. This valve is adapted to remain open to permit flow of fluid at a low velocity but when the velocity increases to a predetermined value the valve closes. Then upon decrease of pressure on the upstream side of the ball to a predetermined value the valve opens. If the relief valve is popped because of a fire close by, the shut-off valve is intended to shut off the flow of inflammable gas through the drain hole and thus to assist in preventing the spread of fire.

In the drawing, Figure 1 represents in diagrammatic form, a side view of a liquefied petroleum gas storage tank equipped with the safety shut-off valve of my invention.

Throughout this specification and claims the term LPG is used to signify liquefied petroleum gas or gases.

Figure 1:
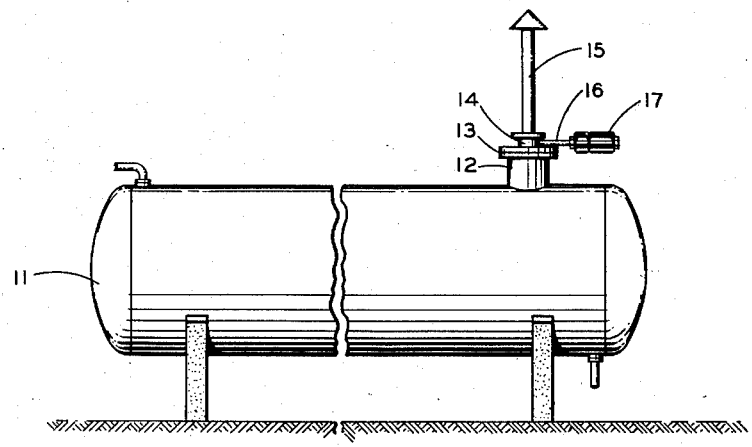

Referring now to the drawing, and specifically to Figure 1, reference numeral 11 identifies a conventional, horizontally disposed LPG storage tank. On top of the tank is disposed a manhole 12 to which is attached a cover plate 13 carrying a pressure relief valve 14. On top of this pressure relief valve is provided a stack 15 for disposal of popped vapors from the tank. A pipe nipple 16 is provided as illustrated for passage of condensate water from the relief valve 14 through an excess flow valve 17.

Figure 2:
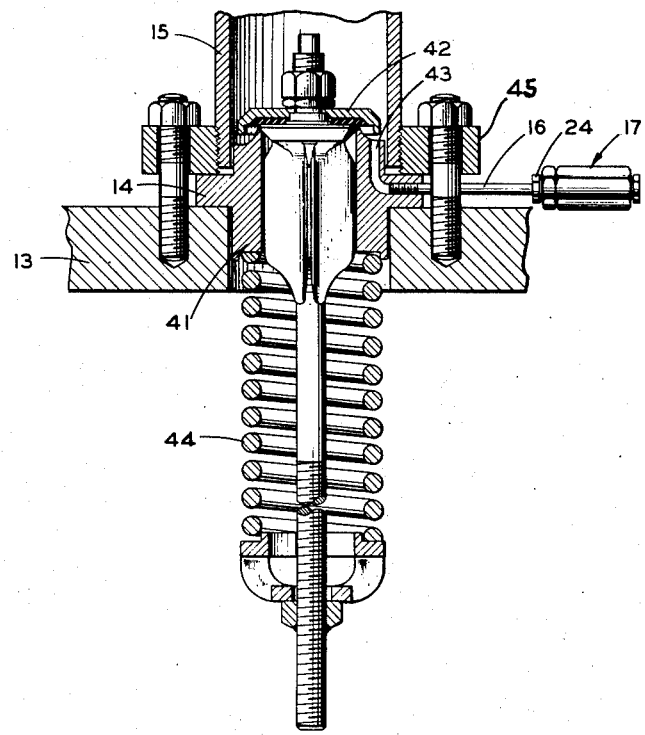
Figure 2 is an elevational view, partly in the section, of a pressure relief valve such as may be used with the apparatus of my invention.

Figure 2 illustrates diagrammatically and partly in section, a relief valve such as those normally used in conjunction with LPG storage tanks. A body 41 of this valve is held rigidly in place by cover member 13. As may be seen a valve 42 is biased in a closed position against its seal under the influence of a compression spring 44. Stack 15 is provided for carrying away inflammable vapors when the valve pops. In one side of the valve body 41 is illustrated the pipe nipple 16 connected with the walls of an opening 43 through the valve body. This pipe nipple 16 and valve 17 are the same nipple and valve mentioned hereinbefore in relation in Figure 1. From the drawing it is seen that when condensate water is formed in the stack 15 it can drain downward and collect in the vicinity of the valve 42 and, as mentioned, in cold weather this water may freeze and prevent proper operation of the valve. Accordingly, this drain hole 43 is provided for disposal of this condensate water.

It has been found that at times when the valve 42 opens and releases pressure from within the liquefied petroleum gas storage tank, gas flows through the drain hole 43. When the valve 42 has popped because of heat from a fire in an adjacent tank, the gas issuing from the drain hole 43 may ignite. A flame in this location is, of course, very close to the tank wall which may warp and even rupture and permit the fire to spread.

Figure 3:
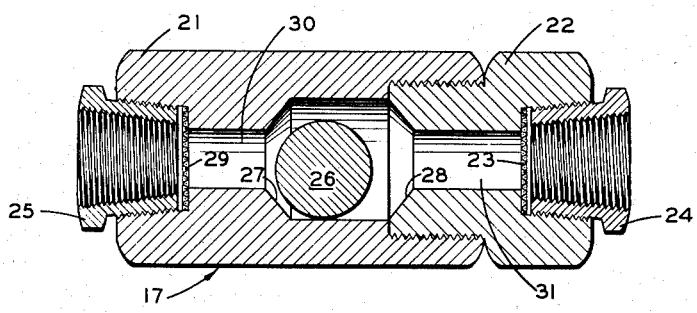
Figure 3 is a longitudinal sectional view of the apparatus of Figures 4 and 5 taken on the line 3—3 of Figure 5.
Figure 5:
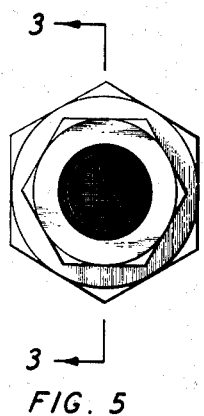
Figure 5 is an end view of the apparatus of Figure 2.
Figure 4:
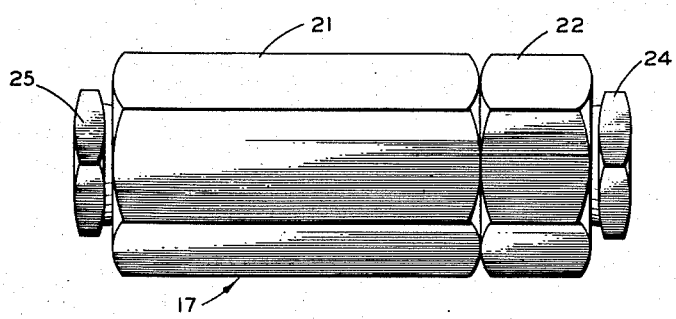
Figure 4 is a side view of a portion of the apparatus of Figure 2.

A valve suitable for use in this application is illustrated in Figures 3, 4 and 5. The valve 17 comprises a body member 21 with a conduit therethrough so arranged as to provide a valve seat 27 for accommodation of a ball valve 26. A bushing member 22 is threaded into the body member as shown. The bushing 22 is also provided with a conduit in such a manner as to provide a ball valve seat 28. One end of the valve assembly is fitted with a bushing 25 for holding a fine mesh screen 29 over the end of the conduit 30. At the opposite end of the valve is a similar screen 23 over the end of conduit 22 held in place by a bushing 24. This valve assembly is so constructed that it serves as a shut-off valve irrespective of the direction of flow of fluid. Illustrative of its use, the end of the valve carrying bushing 24 may be threaded on to the end of the pipe nipple 16, as shown in Figure 1. When installed in this manner the screen 23 prevents ingress of rust or other foreign matter from the tank stack, conduit 43 and nipple 16 while screen 29 is intended to keep out wind blown matter or the like.

The excess flow valve 17 should preferably be made of corrosion resistant material throughout, including the screens 23 and 29. Brass or bronze or other suitable material may be used. If desired the pipe nipple may also be made of corrosion resistant or rust-proof material.

When such a valve is used in such an LPG installation as herein contemplated an operator at regular intervals should service these valves 17 by removing them from their supporting nipples, cleaning the screens and if necessary, disassembling valve member 22 from member 21 to clean the valve ball and seats.

The length of the pipe nipple or pipe 16 will be determined by the desired location where it is desired to dispose of the condensate water. While if desired, this pipe may be relatively long to discharge the water at a remote point, it is preferable that the pipe be merely a nipple so that the water disposal operation may be easily observed by a plant attendant. Since these valves and entire safety assemblies are small, compact and inexpensive, I prefer to install one on each LPG tank in which such highly volatile hydrocarbons as propane and/or butane are stored.

In Figure 1 of the drawing I have shown, for exemplary purposes, the nipple 16 and valve 17 extending from the relief valve 14 in the direction of the front end of the tank 11. The valve is, of course, equally operable whichever its direction from the relief valve. It may extend to one side of the tank, to the other side or even toward the rear and yet come within the scope of my invention.

The valve 17 should preferably be disposed with its axis in a generally horizontal direction. It should not point upward because water from the stack 15 cannot drain out by gravity. The valve cannot point downward because the valve would then obviously be in a closed position at all times.

Another embodiment of ball type excess flow valve which is found useful as a safety valve as herein described, may be made from a single piece of hexagon shaped or round rod, the conduit sections being cut on a lathe. The ball may be inserted through a threaded opening in the sidewall of the large diameter conduit section. This opening is then plugged with a screw plug. The conduit ends may be fitted with fine mesh screens held in place by pipe bushing as hereinbefore explained. Still other types of excess flow valves such as spring loaded excess flow valves may also be used with satisfactory results. However, the valve illustrated in Figures 3, 4 and 5 of the drawing is preferred.

While the pipe nipple 16 is shown and described the use of such a nipple is not essential since the valve 17 may be made integral with the relief valve body member 14 or with the flange member 45 and with a drain opening through this flange and the wall of the stack 15. The drain opening, preferably communicates with the lower portion of the stack.

While I have shown the valve body 14, flange 45, stack 15, drain pipe 16 and ball valve 17 as separate members, it is not essential that they be so constructed. The stack 15 and flange 45 may be a single member, or the stack 15, flange 45 and valve body 14 may be a single member with a ball valve similar to valve 17 being built into the valve body.

The drain pipe 16 may be threaded into a drain conduit extending through the flange 45 and the adjoining wall of stack 15 or the ball valve may be made integral with the flange 45 or with the flange 45 and the stack 15.

While certain embodiments of the invention have been described for illustrative purposes the invention obviously is not limited thereto.

Having disclosed my invention, I claim:

1. A liquefied petroleum gas storage system comprising a pressure storage vessel, a pressure relief valve disposed in communication with the vapor containing space of said vessel, an exhaust conduit in communication with the outlet of said pressure relief valve, said pressure relief valve having valve head and a valve seat therefor, a drainage conduit extending through the wall of said exhaust conduit adjacent said valve seat for drainage of liquid away from said valve head and seat, and a valve in said drainage conduit to control the flow of fluid therethrough.

2. A liquefied petroleum gas storage system comprising a pressure storage vessel, a pressure relief valve disposed in communication with the vapor containing space of said vessel, an exhaust conduit in communication with the outlet of said pressure relief valve, said pressure relief valve having valve head and a valve seat therefor, a drainage conduit extending through the wall of said exhaust conduit adjacent said valve seat for drainage of liquid away from said valve head and seat, and an excess flow check valve in said drainage conduit to cut off the flow of fluid therethrough when it exceeds a predetermined value.

3. A liquefied petroleum gas storage system comprising a pressure storage vessel, a pressure relief valve disposed in communication with the vapor containing space of said vessel, an exhaust conduit in communication with the outlet of said pressure relief valve, said pressure relief valve having valve head and a valve seat therefor, a drainage conduit extending through the wall of said exhaust conduit adjacent said valve seat for drainage of liquid away from said valve head and seat, and a ball type excess flow check valve in said drainage conduit to cut off the flow of fluid therethrough when it exceeds a predetermined value.

4. A liquefied petroleum gas storage system comprising a pressure storage vessel, a pressure relief valve disposed in communication with the vapor space of said vessel, an exhaust conduit in communication with the outlet of said relief valve, said relief valve having a valve head and a valve seat therefor, a drainage conduit communicating with said exhaust conduit adjacent said valve head and seat for drainage of liquid therefrom, and an excess flow check valve in communication with said drainage conduit to cut off the flow of fluid therethrough when said pressure relief valve pops and said flow therethrough exceeds a predetermined value.

5. The system of claim 4 wherein said excess flow check valve is a ball type excess flow check valve.

6. A liquefied petroleum gas storage system comprising a pressure storage vessel, a pressure relief valve disposed in the top wall of said vessel and in communication with the vapor space therein, an exhaust conduit in communication with the outlet of said relief valve, the axis of said exhaust conduit being substantially vertical, said relief valve having a valve head and a valve seat therefor, a drainage conduit communicating with said exhaust conduit adjacent said valve head and seat for drainage of liquid therefrom, and an excess flow check valve in communication with said drainage conduit to cut off the flow of fluid therethrough when said pressure relief valve pops and said flow therethrough exceeds a predetermined value.

7. The system of claim 6 wherein said excess flow check valve in a ball type excess flow check valve.

References Cited in the file of this patent
UNITED STATES PATENTS

| | | |
|---|---|---|
| 240,369 | Blake | Apr. 19, 1881 |
| 398,111 | Abbot et al. | Feb. 19, 1889 |
| 2,071,749 | Knight | Feb. 23, 1937 |
| 2,551,435 | Grogan | May 1, 1951 |